E. P. SPAHN.
Improvement in Camera-Stands.
No. 126,586. Patented May 7, 1872.
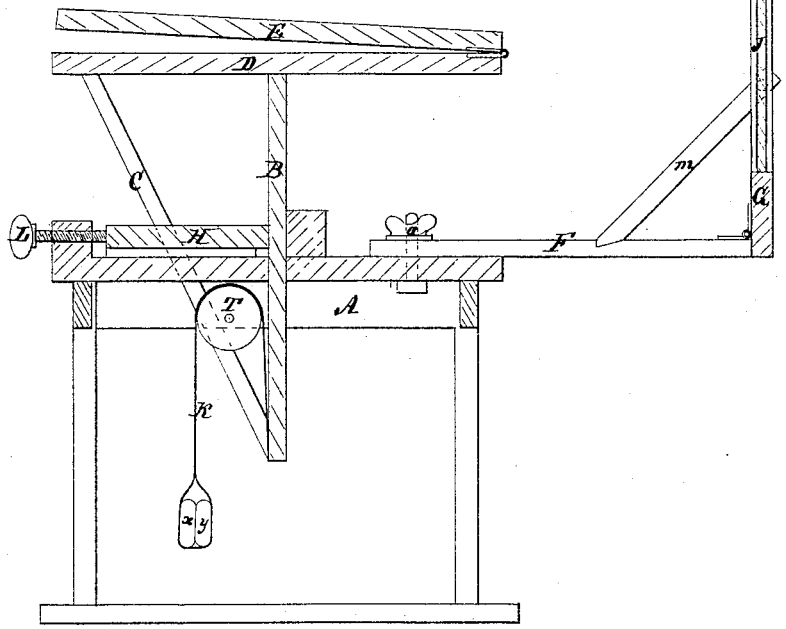
*Fig. I.*
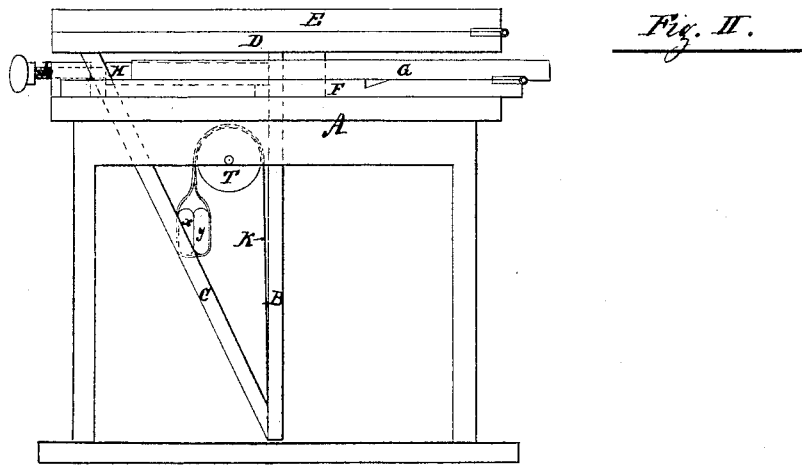
*Fig. II.*
Witnesses
Henry E. Roeder
A. C. Crondal.
Inventor
Emil P. Spahn 126,586

UNITED STATES PATENT OFFICE.

EMIL P. SPAHN, OF NEWARK, NEW JERSEY.

IMPROVEMENT IN CAMERA-STANDS.

Specification forming part of Letters Patent No. 126,586, dated May 7, 1872.

*To all whom it may concern:*

Be it known that I, EMIL P. SPHAN, of Newark, Essex county and State of New Jersey, have invented a new and useful Improvement in Photographic Camera-Stands, of which the following is a specification:

Figure I represents a longitudinal section, and Fig. II is a side view of a stand embodying my invention.

A is a table, near the center of which a plate, B, extending nearly the whole width, is arranged, moving perpendicularly in suitable guides. On the top of this plate B the plate D, to which another plate, E, is hinged, is firmly attached horizontally and strengthened by diagonal braces C. Behind the plate B a slide, H, is arranged upon the table A, moving in suitable guides fast to said table, and operated by a suitable screw, L. This slide H bears nearly against the whole surface of the perpendicular plate B, and holds the same, and, consequently, the top plates D and E, as well as the camera placed on the top of the same by its friction, in any desired position the same may be moved. To the lower end of the perpendicular plate B a band, K, is attached, passing over a roller, T, running in suitable bearings in the frame of the table A, to the other end of which said band weights $x$ $y$ are attached to counterbalance the weight of the perpendicular plate B, the horizontal plates D and E, and the camera placed on top of the stand.

The weights $x$ and $y$ are made in separate pieces on account of the different weights of cameras which may be placed upon the stand.

By the arrangement of the slide H against the perpendicular plate B, so as to hold the movable stand in any desired position by its friction, the same can be kept firmer through its whole width, and the position can be more particularly regulated than in the case of regulating the position by any other means.

Outside of the perpendicular plate B sliding bars F are arranged on each side on the table A, provided with suitable screws to fasten the same in any position. To the ends of these bars F a frame, G, is hinged, provided with braces $m$ to hold the same upright when required. In this frame G a plate, J, is arranged, working in grooves $n$, capable of being raised up or lowered downward. This plate J, when moved in the position as represented in Fig. I, answers for the purpose of attaching any picture to the same which may require to be copied in the camera, and prevents the necessity of an extra table or stand to be placed before the camera for the purpose of attaching the picture to. By means of the sliding bars F the required distance from the camera may be obtained.

When not required the frame G may be folded upon the bars F and moved back upon the table A, as represented in Fig. II, when the same will be quite out of the way.

The hinged plate E is for the purpose of giving any desired obliquity to the camera, and may be fixed in the desired position by means of screws or wedges.

The end of the band K and weights $x$ $y$ must be arranged to move between suitable guides to prevent their swinging about when its stand is moved over the floor.

Instead of attaching the horizontal plate D firmly to the perpendicular plate B, as above described, the same may be hinged to the same, and provided with a hinged brace on its after end passing through a suitable hole in the sliding plate H, and operated on by the screw L at the same time said screw moves the sliding plate H against the perpendicular plate B.

By this arrangement the necessity of the hinged plate E will be obviated, and any desired obliquity may be given to the plate D, this brace acting at the same time to steady the top plate D, dispensing thereby with the braces C.

What I claim as my invention, and desire to secure by Letters Patent, is—

1. The arrangement of a camera-stand, consisting of a perpendicular plate, B, and horizontal plates D and E, sliding in a table, A, in combination with the slide H and weighted band K, substantially as and for the purpose herein set forth.

2. In combination with a camera-stand, I claim the frame G hinged to bars F, arranged on the table A, substantially in the manner and for the purpose described.

EMIL P. SPAHN.

Witnesses:
HENRY E. ROEDER,
A. C. CRONDAL.